United States Patent

Hellsten

[11] Patent Number: 5,861,835
[45] Date of Patent: Jan. 19, 1999

[54] METHOD TO IMPROVE DATA OBTAINED BY A RADAR

[76] Inventor: Hans Hellsten, Palmaers qata 6, S-582 49 Linköping, Sweden

[21] Appl. No.: 836,353

[22] PCT Filed: Nov. 10, 1995

[86] PCT No.: PCT/SE95/01339

§ 371 Date: May 9, 1997

§ 102(e) Date: May 9, 1997

[87] PCT Pub. No.: WO96/15462

PCT Pub. Date: May 23, 1996

[30] Foreign Application Priority Data

Nov. 10, 1994 [SE] Sweden .................................. 9403872

[51] Int. Cl.⁶ ...................................................... G01S 13/90
[52] U.S. Cl. .............................................. 342/25; 342/196
[58] Field of Search ............................. 342/196, 25, 159, 342/162, 16, 17, 192, 203

[56] References Cited

U.S. PATENT DOCUMENTS

| H741 | 2/1990 | Powell et al. ............................. 342/25 |
| 4,471,357 | 9/1984 | Wu et al. ................................... 342/25 |
| 4,612,545 | 9/1986 | Asendorf et al. ..................... 343/18 E |
| 4,616,227 | 10/1986 | Homma et al. ........................... 342/25 |
| 4,985,704 | 1/1991 | Smith ........................................ 342/25 |
| 5,061,931 | 10/1991 | Farina et al. ............................. 342/25 |
| 5,128,679 | 7/1992 | Moffat ..................................... 342/13 |
| 5,138,322 | 8/1992 | Nuttall .................................... 342/126 |
| 5,179,383 | 1/1993 | Raney et al. ............................. 342/25 |
| 5,187,484 | 2/1993 | Stove ...................................... 342/200 |
| 5,235,338 | 8/1993 | Hsiao et al. ............................. 342/109 |
| 5,237,329 | 8/1993 | Bamler et al. ............................ 342/25 |
| 5,248,976 | 9/1993 | Niho et al. ............................... 342/25 |
| 5,410,750 | 4/1995 | Cantwell ................................. 455/306 |
| 5,508,605 | 4/1996 | Lo et al. ............................... 324/76.42 |
| 5,592,170 | 1/1997 | Price et al. ............................... 342/22 |
| 5,627,543 | 5/1997 | Moreira ................................... 342/25 |

*Primary Examiner*—John B. Sotomayor
*Attorney, Agent, or Firm*—Jacobson, Price, Holman & Stern, PLLC

[57] ABSTRACT

A method of improving data obtained by radar by interpolation over frequency bands jammed by narrow-band interference, at which the following steps (A)–(J) are carried out. (A) It is determined what frequency values are affected by narrow-band interference. (B) Every radar return which is continuously connected in time and represented by a time-discrete real or complex signal $f(t_i)$, containing N sample, i=1, 2, . . . , N, is Fourier-transformed into a frequency-discrete function $F(\omega_i)$, given by N sample. (C) A series of integers $N_1, N_2, \ldots, N_M$ is fixed, such that $1 \leq N_1 < N_2 < \ldots < N_M < N$. (D) The signal processing device sets $F_k(\omega_i) = H_k(\omega_i)$ within intervals having narrow-band interference. (E) $H_1(\omega_i)$ is equated to 0 and $H_k(\omega_i)$ for $k \geq 2$ is constructed according to the following steps (F)–(H). (F) $F_{k-1}(\omega_i)$ is inversely Fourier-transformed into a time-discrete function $f_{k-1}(t_i)$. (G) The signal processing device sets $h_k(t_i) = f_{k-1}(t_i)$ for i=1, 2, . . . , $N_{k-1}$, wherein $|f_{k-1}(t_i)|$ constitute the $N_k$-greatest values of $|f_{k-1}(t_i)|$ and $h_{k-1}(t_i) = 0$ for the remaining $N - N_{k-1}$ values of the function. (H) $h_{k-1}(t_i)$ is Fourier-transformed into a frequency-discrete function $H_k(\omega_i)$. (I) Steps (D)–(H) are repeated M times, wherein $1 \leq k \leq M$. (J) $F_{NM}(\omega_i)$ is inversely Fourier-transformed to give the finally filtered radar return $f_{NM}(t_i)$.

6 Claims, 4 Drawing Sheets

= SIZE OF VECTOR

METHOD TO IMPROVE DATA OBTAINED BY A RADAR

BACKGROUND OF THE INVENTION

Method to improve data obtained by a radar.

1. Field of the Invention

The present invention relates to a method of improving data obtained by radar.

2. Description of the Prior Art

A problem that may arise in the context of radars is that the reception of radar signals can be jammed by radio and television transmissions. Especially in wide band low-frequency radar of the type that is called CARABAS® (Coherent All Radio Band Sensing) and is the subject matter of Swedish Patent No. 8406007-8 (456,117) and European Patent 86900306.1 (202,320), this is a crucial problem. The signal intensity of at least local radio and TV stations is, at the frequencies thereof, much higher than the signal intensity of CARABAS at the corresponding frequencies. Moreover, it is impossible to increase the output power of a radar station to a sufficient degree to compete with the radio and TV signals. Besides, this is illegal. Instead it is convenient to exclude, if possible, such frequencies in the output signal or at least neglect the received signal at these frequencies.

SUMMARY OF THE INVENTION

To be able to perform the desired signal processing over the entire frequency interval that applies to the radar, it is desirable that narrow band interferences of the discussed type can be filtered off and replaced with an estimated value of the signal intensity. The invention has solved this problem.

BRIEF DESCRIPTION OF THE DRAWINGS

The invention will now be described in more detail with reference to the accompanying drawings in which.

DETAILED DESCRIPTION OF THE EMBODIMENTS

Figure 1:
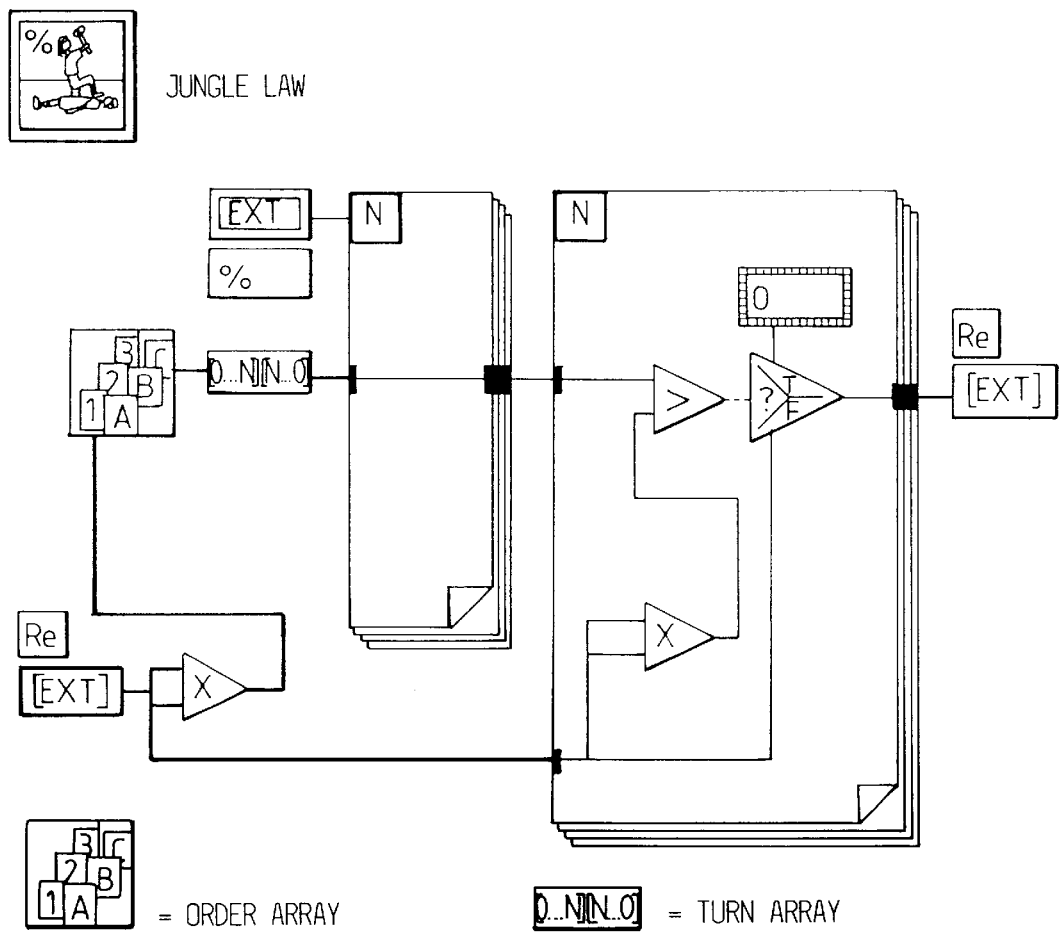
FIG. 1 shows a first subroutine as used when implementing the invention in LabView2 called "Jungle Law"

The present invention has been developed on the basis of the above-mentioned wide band radar equipment CARABAS, and in the following it will principally be described in view of this equipment. However, it is obvious to those skilled in the art that it may also be used in the context of other radars, which is consequently included in the scope of protection according to the claims.

Whether, when transmitting radar signals, certain frequencies have been excluded or not, the received radar data will be fragmented into a number of bands which are independent of each other and between which interference from radio transmissions etc. has caused gaps void of relevant radar data. In this context, there is no essential difference between the image spectrum in a SAR radar and general radar raw data, but by such an image spectrum is here meant radar data, from which the actual image is obtained by an inverse two-dimensional Fourier transform. In fact, the SAR image is obtained from radar raw data by a process which associates the transmitted frequency and the Doppler frequency of these data with the azimuth and radial frequencies of the image spectrum, respectively. Radio transmissions etc. will appear as concentric rings of destroyed data in this two-dimensional spectrum. The radial frequency of the rings will correspond to the transmitted frequencies at which interference occurs.

To evaluate the extent of degradation that occurs in the radar image owing to the degradation of radar data, assumptions must be made regarding the statistics of radar data and the radar image. For radar data, the statistics are highly constant and may be regarded as a spectrum of random phase, in which however there is little probability of great variations of amplitude (after adjusting for sensitivity fluctuations in the radar system).

On the other hand, the image is characterised by a highly non-uniform amplitude distribution, which in the ideal case consists of discrete, stronger reflectors against a background of weak reflectors of uniform strength. The strong reflectors are the targets that are to be detected by the radar.

Since there is no previous knowledge at all of the phase values of the spectrum in the missing points, all guesses are equally probable. In the invention, the amplitude value therefore is set to zero in these points.

Radar data may then be considered the joint result of two processes, viz. one corresponding to ideal radar data, and another which is an error process which precisely cancels these data in the jammed intervals. Both processes have a random phase. Because of the random phase, the power ratio between the error process and the ideal process is the ratio between the missing points and all points. If half of the points are missing, the relative error thus is −3 dB. This ratio is here called relative error power which is abbreviated to REP.

In the following it is assumed that received radar data at frequencies jammed by radio transmissions have been set to zero. Then the combined presence of radar returns from the stronger reflectors and radio interference results in side lobes from these reflectors being spread over the entire image and being misinterpreted as weak reflectors. For the stronger reflectors themselves, it is however improbable that side lobes could add up to provide comparatively equally strong reflectors.

In a first estimate of data in the jammed spectral intervals, the situation may therefore be improved by assuming that the strongest reflectors are the only ones. By interpolating data in the jammed intervals on the basis of this assumption, the side lobes from the strongest reflectors will diminish, such that the threshold for eliminating false values can be lowered. It is then possible to make a second iteration, including a wider range of strong reflectors to establish a better estimate of the spectrum at the missing frequencies. This entails that the side lobe levels drop further etc.

When proceeding to weaker and weaker reflectivities, the number of included reflectors becomes increasingly larger. The chance that a false target becomes stronger than an actual target therefore increases rapidly. If the number of false targets exceeds the number of actual targets in an iteration step, this step deteriorates the calculation. A solution to this is to carry out the interpolation by including more and more targets in a given manner, rather than to lower the threshold in given steps.

In experiments, a power of two series has been used, including as the basis of the iteration, in the first step, the strongest reflector only, in the next step the two strongest, then the four strongest and so on. The iteration ends when half of the pixels have been included in the interpolation. This process has the advantage of an exponential progress rate, which makes it suitable for handling very large numbers of pixels. At the same time, it takes good care of the fact that a SAR image can contain a smaller number of very strong scatterers, while the great majority of targets present a relatively small contrast to the noise floor. The method has been found to work well on simulated data.

The invention thus relates to a method of improving data obtained by radar by interpolating over frequency bands jammed by narrow-band interference, i.e. interference having a smaller band width than the band width of the received radar reflex, and may in a concentrated fashion be described as follows.

In a known manner, a radar signal is produced in a radar transmitter and is transmitted via an aerial system. The radar return is received via an aerial system in a radar receiver and is processed in a signal processing device. Then the following steps (A)–(J) are carried out.

(A) It is determined, by monitoring or in some other fashion, what frequency values are affected by narrow-band interference.

(B) Every radar return which is continuously connected in time and represented by a time-discrete real or complex signal $f(t_i)$, containing N sample, is Fourier-transformed into a frequency-discrete function $F(\omega_i)$, given by N sample. In both cases, index i runs from 1 to N. $i=1,2,\ldots,N$.

(C) A series of integers $N_1, N_2, \ldots, N_M$ is fixed, such that $1 \leq N_1 < N_2 < \ldots < N_M < N$.

(D) $F(\omega_i)$ is modified to a function $F_k(\omega_i)$ by the signal processing device setting $F_k(\omega_i)=F(\omega_i)$ outside narrow-band interference and $F_k(\omega_i)=H_k(\omega_i)$ within intervals having narrow-band interference.

(E) $H_1(\omega_i)$ is equated to 0 and $H_k(\omega_i)$ for $k \geq 2$ is constructed according to the following steps (F)–(H).

(F) $F_{k-1}(\omega_i)$ is inversely Fourier-transformed into a time-discrete function $f_{k-1}(t_i)$.

(G) $f_{k-1}(t_i)$ is modified to a function $h_k(t_i)$ by the signal processing device setting $h_k(t_i)=f_{k-1}(t_i)$ for $i=1,2,\ldots,N_{k-1}$, wherein $|f_{k-1}(t_i)|$ constitute the $N_{k-1}$ greatest values of $|f_{k-1}(t_i)|$ and $h_k(t_i)=0$ for the remaining $N-N_{k-1}$ values of the function.

(H) $h_k(t_i)$ is Fourier-transformed into a frequency-discrete function $H_k(\omega_i)$.

(I) Steps (D)–(H) are repeated M times, wherein $1 \leq k \leq M$.

(J) $F_{N_M}(\omega_i)$ is inversely Fourier-transformed to give the finally filtered radar return $f_{N_M}(t_i)$.

For a SAR radar, the corresponding steps can be carried out in two dimensions. In this case, the narrow-band interference occurs as jammed intervals in the Fourier transform of the SAR image. The jammed intervals have the character of concentric rings in the two-dimensional spectrum, i.e. they appear as jammed intervals in the interval $\Omega \leq \sqrt{\omega_i^2 + \mu_j^2} \leq \Omega'$, wherein the pairs of values $\Omega, \Omega'$ represent each individual interference band.

Steps (A)–(J) will have the following contents.

(A) It is determined, by monitoring or in some other manner, what frequency values are affected by narrow-band interference.

(B) The image is described by a time-discrete real or complex signal $f(x_i, y_j)$, containing N×N sample, which is Fourier-transformed into a frequency-discrete function $F(\omega_i, \mu_j)$, given by N×N sample. In both cases, index i, j runs from 1 to N, $i=1,2,\ldots,N$, $j=1,2,\ldots,N$.

(C) A series of integers $N_1, N_2, \ldots, N_M$ is fixed, such that $1 \leq N_1 < N_2 < \ldots < N_M < N^2$.

(D) $F(\omega_i, \mu_j)$ is modified to a function $F_k(\omega_i, \mu_j)$ by the signal processing device setting $F_k(\omega_i, \mu_j)=F(\omega_i, \mu_j)$ outside narrow-band interference and $F_k(\omega_i, \mu_j)==H_k(\omega_i, \mu_j)$ within intervals having narrow-band interference.

(E) $H_1(\omega_i, \mu_j)$ is equated to 0 and $H_k(\omega_i, \mu_j)$ for $k \geq 2$ is constructed according to the following steps (F)–(H).

(F) $F_{k-1}(\omega_i, \mu_j)$ is inversely Fourier-transformed into a time-discrete function $f_{k-1}(x_i, y_j)$.

(G) $f_{k-1}(x_i, y_j)$ is modified to a function $h_k(x_i, y_j)$ by the signal processing device setting $h_k(x_i, y_j)=f_{k-1}(x_i, y_j)$ for $i=1,2,\ldots,N_{k-1}$, wherein $|f_{k-1}(x_i, y_j)|$ constitute the $N_{k-1}$ greatest values of $|f_{k-1}(x_i, y_j)|$ and $h_k(x_i, y_j)=0$ for the remaining $N-N_{k-1}$ values of the function.

(H) $h_k(x_i, y_j)$ is Fourier-transformed into a frequency-discrete function $H_k(\omega_i, \mu_j)$.

(I) Steps (D)–(H) are repeated M times, wherein $1 \leq k \leq M$.

(J) $F_{N_M}(\omega_i, \mu_j)$ is inversely Fourier-transformed to give the finally filtered radar image $f_{N_M}(x_i, y_j)$.

In embodiments according to one of the above-mentioned methods, it is convenient to select the numbers $N_1, N_2, \ldots, N_M$ in step (B) according to $N_k=2^{k-1}$, wherein k is the integer $1 \leq k \leq M$.

Moreover, it is convenient in the one-dimensional case to select the number M as the closest integer of $$^2\log\left(\frac{N}{2}\right) - 1,$$

i.e. such that $N_M \approx \leq N/2$. The same applies to the two-dimensional case if N is exchanged for N×N.

In the above SAR case, the image has been assumed to be square, N×N, which immediately suggests itself. However, it is of course conceivable to use instead a rectangular image, N'×N". A rectangular image can be seen as the interesting part of a larger square image. In the rectangular image, the missing rings are to be found as segments of a circle in the image. On the other hand, it is always possible to go from a rectangular image to a square by embedding the rectangular image in a square image and filling the rest of the square image with zeros in respect of signals.

The invention has been implemented by means of the graphic shell LabView 2 from National Instruments to the programming language C and will be described by using symbols created by means of this program. The names of the various subroutines included in the program have been inspired by a superficial analogy with Darwinistic evolution. There is, of course, no real connection.

The basic subroutine is in this spirit called "Jungle Law" and is graphically represented in FIG. 1. The program is composed of routines that either retain the various values in a real bipolar array or set them to zero. The fact that decides whether an element in the array is to be retained or not is whether the value exceed a threshold value or not.

The array is sorted in order of increasing magnitude and is reversed to be sorted in order of rank. A predetermined rank number sets the threshold value above which data values will be left unchanged. Thus assuming that two similar array values do not exist, the number of non-zero values will agree with the rank number of the threshold value.

Figure 2:
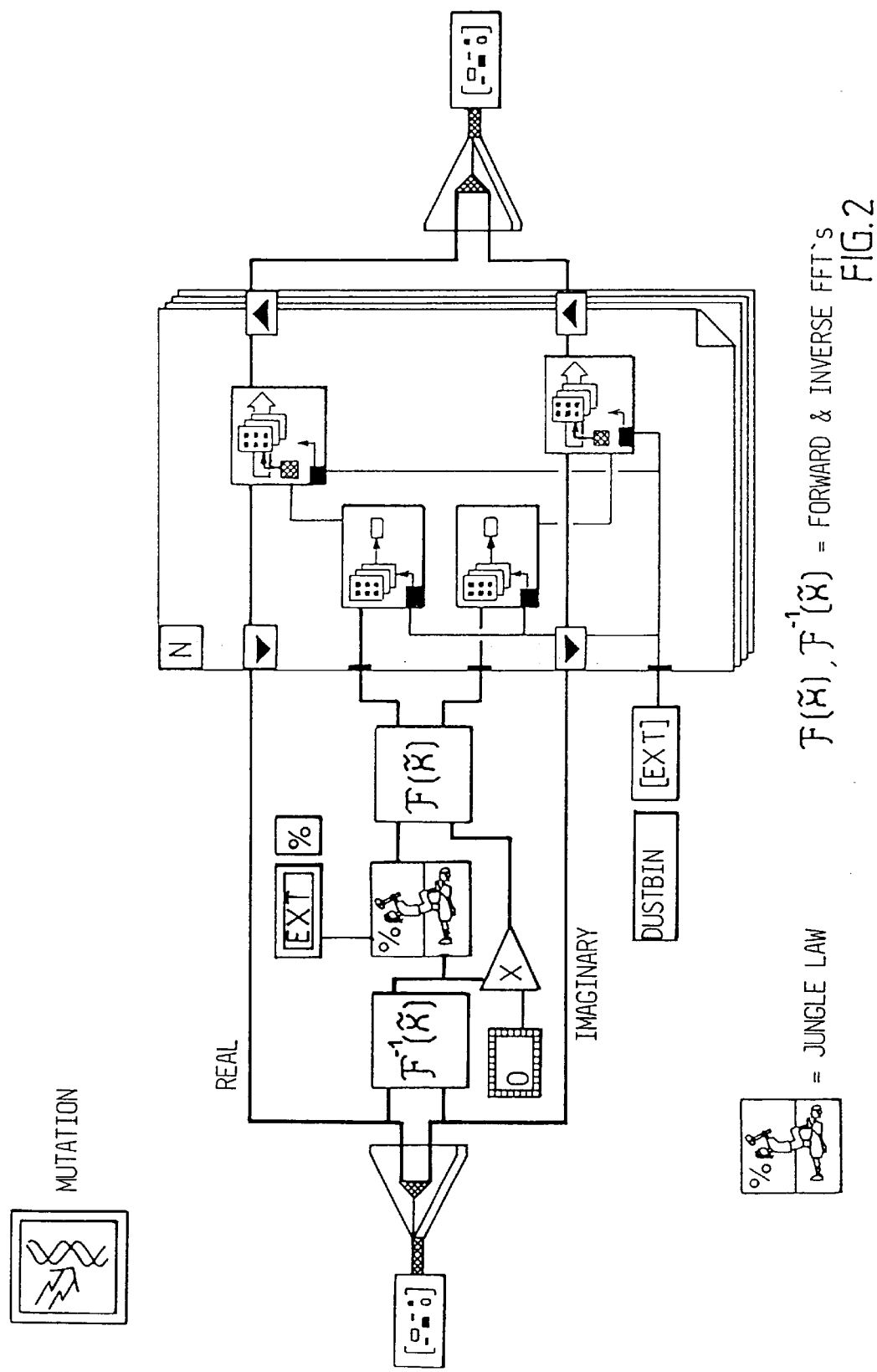
FIG. 2 shows a second subroutine as used when implementing the invention in LabView 2, called "Mutation"

The next level is the program "Mutation", which fills in the missing frequency data and is shown in FIG. 2. The input value is the complex array of frequency-dependent data, the rank number of the threshold value and the array of missing frequencies. From the data array, an image array is obtained as the real part after an inverse FFT (Fast Fourier Transform). The "Jungle Law" is allowed to have effect on this to keep only the strongest image array values non-zero. After feeding zeros into the imaginary part, frequency data are obtained by a forward FFT. Values are picked from this array and are allowed to replace the values that are to be found in the array positions that have been listed as points having no frequency data. The positions are obtained from the program "Dustbin", see below.

Figure 3:
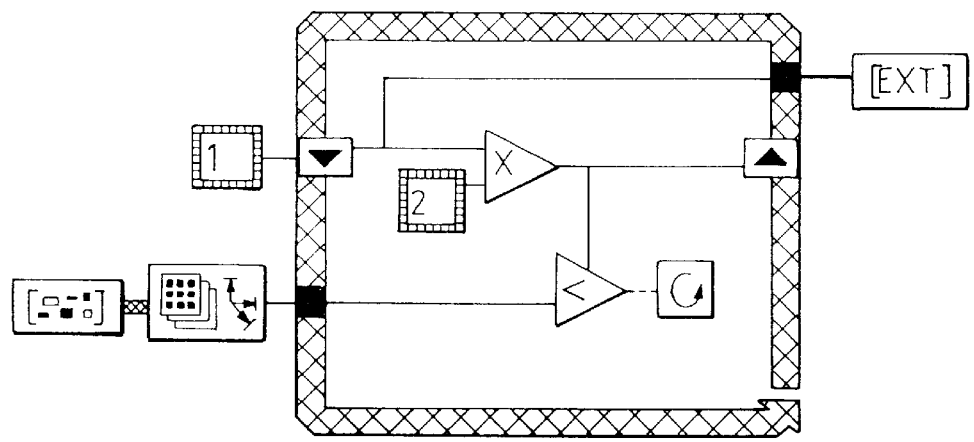
FIG. 3 shows a third subroutine as used when implementing the invention in LabView 2, called "Geometric Machine"

The program that lowers the rank number of the threshold value in the iteration is called "Geometric Machine" and is shown in FIG. 3. The input value of the program is again the complex array of frequency data. The only information from these data that is used is the length of the array. The rank number of the threshold value is obtained from a shift register, which is originally set to unity. When the program is activated, it replaces the value in the shift register by this value multiplied by two as long as this value is less than half the length of the array. All the values occurring in the shift register are collected to an output array representing the sequence of the rank numbers of the threshold values.

Figure 4:
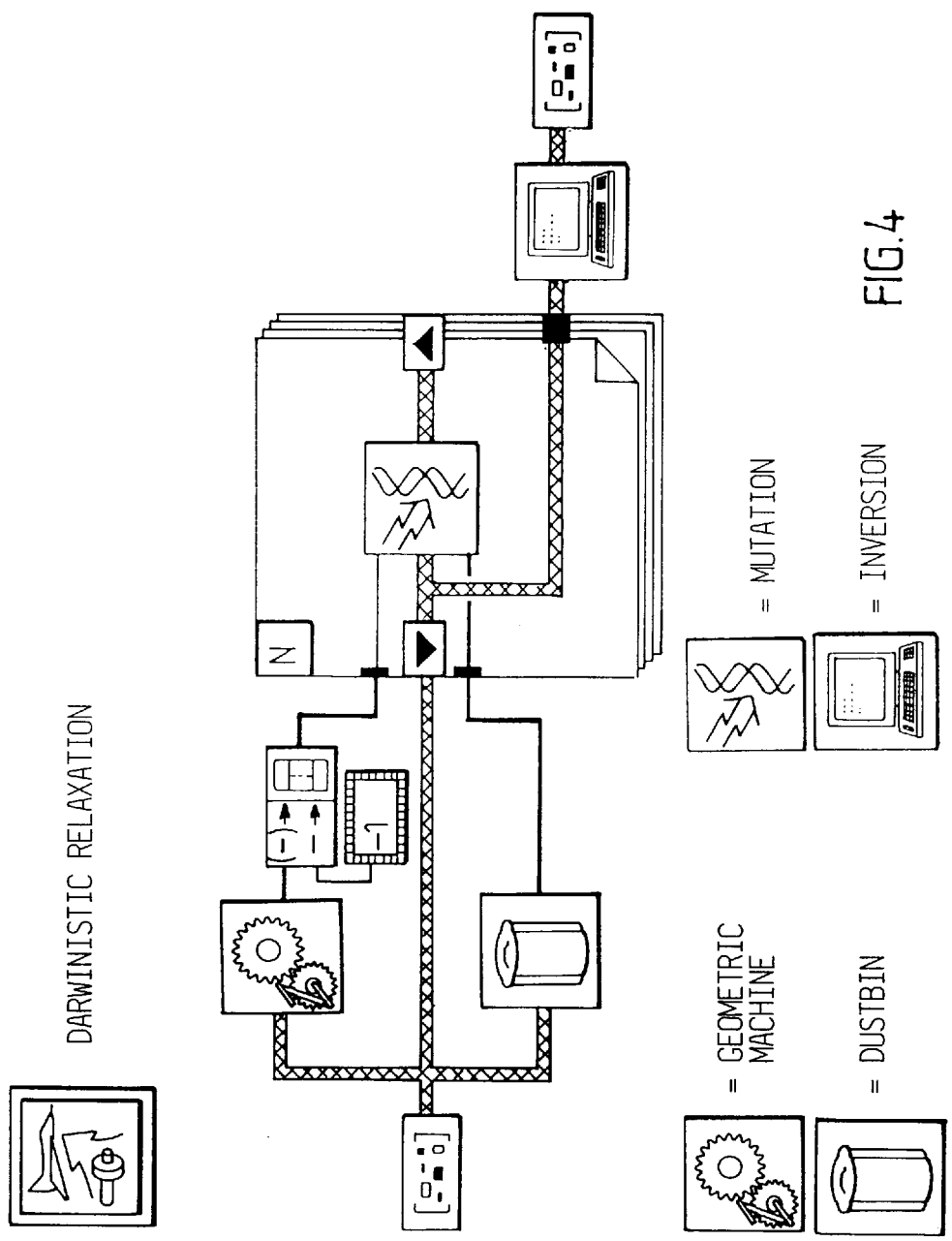
FIG. 4 shows the main routine as used when implementing the invention in LabView 2, called "Darwinistic Relaxation".

The last step is the main routine "Darwinistic Relaxation" which is shown in FIG. 4. In addition to the programs "Mutation" and "Geometric Machine", it also uses the programs "Dustbin" and "Inversion". In their present form, they are easily described.

In the present case, "Dustbin" is a subroutine which checks in which array positions the frequency-dependent data array is zero, and returns them as an array. "Inversion" contains a one-dimensional FFT only and picks out the real part of the FFT which it adapts to graphical display after selecting a suitable parameter.

"Darwinistic Relaxation" initialises a shift register by means of the incoming array of frequency data. By means of the program "Geometric Machine", it then reads off the values in the array above the rank numbers of the threshold values in order to refine, by the program "Mutation", the data array in the shift register and replace the old data array by the refined one. This continues for all the elements in the array above the rank numbers of the threshold values. Finally, a "-1" is fed as such a rank number, which forces only one further iteration of the shift register, such that the end result is fed to the "Inversion" program.

For real SAR data, it is in various ways possible to detect, prior to the interpolation, what frequencies are jammed. Therefore, one may assume that the rings of frequencies jammed by radio transmissions etc. have been set to zero also in the real situation.

A simple technique of determining where interference occurs is to quite simply listen to received signals parallel to the radar receiver. It is also possible to detect broadcast interference by transforming a SAR image into histograms of frequency data. These would yield a sharp threshold value which divides received amplitudes into probable radar data and probable interference.

The filtering program implemented in LabView as above has been tested on simulated data. The Input values were histograms of SAR images and their one-dimensional counterparts and radio transmission statistics. A REP value which is tolerable for SAR images is less than -10 dB. The result of the filtering by "Darwinistic Relaxation" meant a reduction of REP, in such a manner that if 30-40% of the available bandwidth is jammed by radio interference, "Darwinistic Relaxation" results all the same in usable images. Without filtering, only 6-10% of the bandwidth can be missing. In other words, at 30-40% fallout, the REP value is reduced by the filtering so as to be comparable with the REP value at 5-10% fallout without filtering.

I claim:

1. A method of Improving data obtained by radar, by interpolation over frequency bands jammed by interference having a smaller bandwidth than the bandwidth of the received radar return, comprising production of a radar signal in a radar transmitter, transmitting of the radar signal via an aerial system, receiving of radar returns via an aerial system in a radar receiver and processing of the radar return in a signal processing device, the method comprising, (A) monitoring what frequency values are affected by narrow-band interference, (B) Fourier-transforming every radar return which is continuously connected in time and represented by a time-discrete real or complex signal $f(t_i)$, containing N sample, i-1,2, . . . , N, into a frequency-discrete function $F(\omega_i)$, given by N sample, i=1,2, . . . , N, (C) fixing a series of integers $N_1, N_2, \ldots, N_M$, such that $1 \leq N_1 < N_2 < \ldots < N_M < N$, (D) modifying $F(\omega_i)$ to a function $F_k(\omega_i)$ by the signal processing device setting $F_k(\omega_i) = F(\omega_i)$ outside narrow-band interference and $F_k(\omega_i) = H_k(\omega_i)$ within intervals having narrow-band interference, (E) equating $H_1(\omega_i)$ to 0 and constructing $H_k(\omega_i)$ for $k \geq 2$ according to the following steps (F)–(H).

(F) inversely Fourier-transforming $F_{k-1}(\omega_i)$ into a time-discrete function $f_{k-1}(t_i)$, (G) modifying $f_{k-1}(t_i)$ to a function $h_k(t_i)$ by the signal processing device setting $h_k(t_i) = f_{k-1}(t_i)$ for i=1,2, . . . , $N_{k-1}$, wherein $|f_{k-1}(t_i)|$ constitute the $N_{k-1}$ greatest values of $|f_{k-1}(t_i)|$ and $h_k(t_i) = 0$ for the remaining $N - N_{k-1}$ values of the function, (H) Fourier-transforming $h_k(t_i)$ into a frequency-discrete function $H_k(\omega_i)$, (I) and repeating steps (D)–(H) M times, wherein $1 \leq k \leq M$, and finally (J) inversely Fourier-transforming $F_{N_M}(\omega_i)$ to give the finally filtered radar return $f_{N_M}(t_i)$.

2. The method as claimed in claim 1, wherein the numbers $N_1, N_2, \ldots, N_M$ in step (B) are selected according to $N_k = 2^{k-1}$, wherein k is the integer $1 \leq k \leq M$.

3. The method as claimed in claim 2, wherein the number M is selected as the closest integer of $$^2\log\left(\frac{N}{2}\right) - 1.$$

4. A method of improving a radar image in a SAR radar by interpolating over frequency bands which are to be found in jammed intervals in the interval $\Omega \leq \sqrt{\omega_i^2 + \mu_j^2} \leq \Omega'$, comprising production of a radar signal in a radar transmitter, transmitting of the radar signal via an aerial system, receiving of radar returns via an aerial system in a radar receiver and processing of the radar return in a signal processing device, comprising, inter alia, the preparing of a two-dimensional radar image, the method comprising, (A) monitoring what frequency values are affected by narrow-band interference, (B) describing the image by a time-discrete real or complex signal $f(x_i, y_j)$, containing N'×N" sample, i=1,2, .

..., N', j=1,2, ..., N", which is a Fourier-transformed into a frequency-discrete function $F(\omega_i, \mu_j)$, given by N'×N" sample, i=1,2, ..., N', j=1,2, ..., N", (C) fixing a series of integers $N_1, N_2, ..., N_M$, such that $1 \leq N_1 < N_2 < ... < N_M < N' \times N"$, (D) modifying $F(\omega_i, \mu_j)$ to a function $F_k(\omega_i, \mu_j)$ by the signal processing device setting $F_k(\omega_i, \mu_j) = F(\omega_i, \mu_j)$ outside narrow-band interference and $F_k(\omega_i, \mu_j) = = H_k(\omega_i, \mu_j)$ within intervals having narrow-band interference, (E) equating $H_1(\omega_i, \mu_j)$ to 0 and constructing $H_k(\omega_i, \mu_j)$ for $k \geq 2$ according to the following steps (F)–(H), (F) inversely Fourier-transforming $F_{k-1}(\omega_i, \mu_j)$ into a time-discrete function $f_{k-1}(x_i, y_j)$, (G) modifying $f_{k-1}(x_i, y_j)$ to a function $h_k(x_i, y_j)$ by the signal processing device setting $h_k(x_i, y_j) = f_{k-1}(x_i, y_j)$ for i=1,2, ..., $N_{k-1}$, wherein $|f_{k-1}(x_i, y_j)|$ constitute the $N_{k-1}$ greatest values of $|f_{k-1}(x_i, y_j)|$ and $h_k(x_i, y_j) = 0$ for the remaining $N - N_{k-1}$ values of the function, (H) Fourier-transforming $h_k(x_i, y_j)$ into a frequency-discrete function $H_k(\omega_i, \mu_j)$, (I) and repeating steps (D)–(H) M times, wherein $1 \leq k \leq M$, and finally (J) inversely Fourier-transforming $F_{N_M}(\omega_i, \mu_j)$ to give the finally filtered radar image $f_{N_M}(x_i, y_j)$.

5. The method as claimed in claim 4, wherein the numbers $N_1, N_2, ..., N_M$ in step (B) are selected according to $N_k = 2^{k-1}$, wherein k is the integer $1 \leq k \leq M$.

6. The method as claimed in claim 5, wherein the number M is selected as the closest integer of $$^2\log\left(\frac{N' \times N"}{2}\right) - 1.$$

* * * * *